Aug. 10, 1926. 1,595,760

J. L. CROUSE

GEAR CASE

Filed Sept. 8, 1923

WITNESSES:

INVENTOR
John L. Crouse
BY
ATTORNEY

Patented Aug. 10, 1926.

1,595,760

UNITED STATES PATENT OFFICE.

JOHN L. CROUSE, OF WILKINSBURG, PENNSYLVANIA, ASSIGNOR TO WESTINGHOUSE ELECTRIC & MANUFACTURING COMPANY, A CORPORATION OF PENNSYLVANIA.

GEAR CASE.

Application filed September 8, 1923. Serial No. 661,576.

My invention relates to gear cases, more especially to such cases or housings as are employed for enclosing the gear trains embodied in electric vehicle drives.

It is among the objects of my inventon to provide a gear case which shall be of durable mechanical construction having reinforced end members and which shall be designed in such manner as to seat uniformly along its seams under all service conditions.

Gear cases of the type employed for enclosing the drive gears of electrical railway vehicles are usually formed of malleable iron castings or of pressed steel members, forming the two halves of the split housing that is provided at its respective ends with clamping brackets by which the gear case is mounted on its supports and simultaneously clamped to form a unitary housing. The method of fastening the halves of the casing to the support does not provide a good seating of the parts along the seam or joint, and this is further aggravated in service where the strains and vibrations cause considerable wear between the support and casing, resulting in the latter moving freely thereon.

My present invention is directed to a gear case comprising two halves which are joined along the longitudinal axis of the casing by means of end brackets which are so designed as to provide proper seating of the members before the gear case is secured to its supports.

In the accompanying drawing, constituting a part hereof and in which like reference characters designate like parts, Fig. 1 is a plan view of a gear case embodying the principles of my invention;

Figure 1:
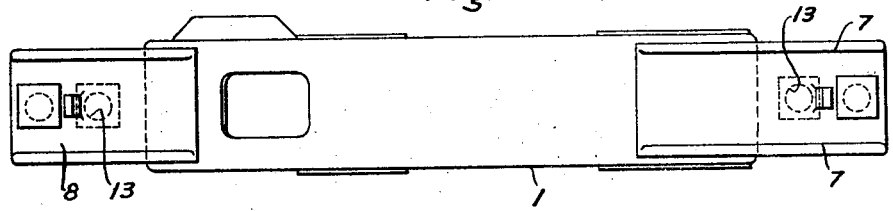
Figure 2:
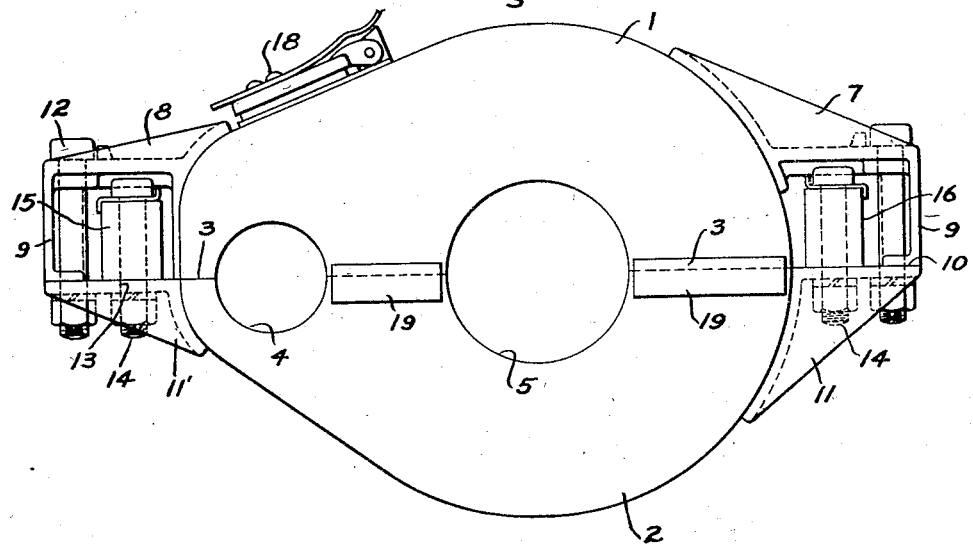
Fig. 2 is a side elevational view thereof.
Figure 3:
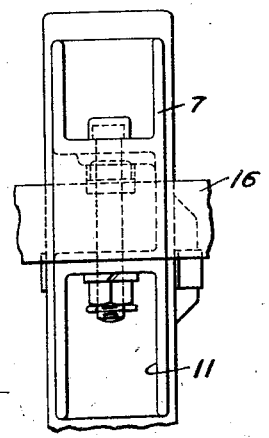
Fig. 3 is an end elevation taken from the right-hand side of the drawing.

Referring to Fig. 2, the gear case comprises two substantially semi-elliptical housings 1 and 2 either cast or formed of sheet metal, which are adapted to be joined along the longitudinal seam 3 to form an enclosing cover for a gear train (not shown). The gear case is provided with openings 4 and 5 adapted to fit around the motor shaft and wheel axle, respectively, the former having a pinion mounted thereon in co-operative engagement with a gear wheel secured to the wheel axle.

The casing is usually packed with grease and, for this reason, it is desirable to make the seam or joint 3 leak-proof, if possible. To provide such a joint between the housings 1 and 2, I employ special end brackets consisting of two upper brackets 7 and 8 having spacing arms 9 integral therewith and which are adapted to seat against the co-operating surfaces 10 of the lower brackets 11 and 11'. The end brackets are secured to the casing in any suitable manner, as by riveting or welding, or they may be formed or cast integrally therewith.

The depending spacing members 9 permit of accurate alinement of the members 1 and 2 along the joint 3 and adapts them to be clamped by bolts 12 extending through openings provided in the upper and lower brackets 7 and 8 and 11 and 11', respectively. The lower brackets 11 and 11' are provided with openings 13 adapted to receive clamping bolts 14 extending through the supporting arms 15 and 16 of the motor bracket and axle caps, respectively. By securing the casing to the axle and motor support in the manner described, the strains which previously tended to spread and wear the brackets of the casing are confined to the supports themselves, and, by this method of securing the gear case parts independently of their supports, an efficient seam is provided therebetween. The upper gear housing is usually provided with an oiling cap 18 and side strips 19, the latter being welded to the face of the housing to aid in alining the members and to prevent relative movement therebetween.

It will be understood from the above description of my invention that gear cases made in accordance therewith are of simple and durable construction and will withstand the deteriorating effects of the severe service to which they are subjected. Although I have described a specific embodiment of my invention, it will be obvious to those skilled in the art that various modifications may be made in the details of construction without departing from the principles herein set forth.

I claim as my invention:—

1. A gear case comprising a split housing having extended end portions provided with spacing arms and adapted to receive a plurality of screw bolts, said arms constituting clamp supports for certain of said bolts and providing seating portions for a plurality of supports to which said housing is mounted.

2. A gear case comprising a longitudinally split housing adapted to be mounted on a plurality of shafts, clamping means on said housing for joining the parts of the same, and means independent of said clamping means for securing said case to a plurality of supports, said clamping means comprising extension brackets having bolts extending therethrough by which the housing is securely joined, and said mounting means comprising transverse openings in said brackets for receiving supports to which the housing is adapted to be bolted.

3. A gear case comprising a longitudinally split housing adapted to be mounted on a plurality of shafts, clamping means on said housing for joining the parts of the same, and means independent of said clamping means for securing said case to a plurality of supports, said clamping means comprising extension brackets, some of which are provided with spacing arms to provide openings or adapted to receive supports, and bolts securing said housing and for securing the same to said supports.

In testimony whereof, I have hereunto subscribed my name this 23rd day of August, 1923.

JOHN L. CROUSE.